United States Patent
Ho et al.

(10) Patent No.: US 11,320,895 B2
(45) Date of Patent: *May 3, 2022

(54) METHOD AND APPARATUS TO COMPOSE A STORY FOR A USER DEPENDING ON AN ATTRIBUTE OF THE USER

(71) Applicant: IPLContent, LLC, Mountain View, CA (US)

(72) Inventors: Chi Fai Ho, Palo Alto, CA (US); Peter P. Tong, Mountain View, CA (US)

(73) Assignee: IPLContent, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,611

(22) Filed: Mar. 11, 2020

(65) Prior Publication Data

US 2020/0209956 A1    Jul. 2, 2020

Related U.S. Application Data

(63) Continuation of application No. 16/299,863, filed on Mar. 12, 2019, now Pat. No. 10,606,346, which is a continuation of application No. 15/193,463, filed on Jun. 27, 2016, now Pat. No. 10,261,575, which is a
(Continued)

(51) Int. Cl.
| | |
|---|---|
| *G09G 5/00* | (2006.01) |
| *G06F 3/01* | (2006.01) |
| *G06F 40/166* | (2020.01) |
| *H04L 67/02* | (2022.01) |
| *H04L 67/52* | (2022.01) |

(52) U.S. Cl.
CPC ............ *G06F 3/011* (2013.01); *G06F 40/166* (2020.01); *H04L 67/02* (2013.01); *H04L 67/18* (2013.01); *G06F 2203/011* (2013.01)

(58) Field of Classification Search
USPC ......... 345/501, 156, 173; 709/217; 715/753, 715/776, 230, 234, 738, 254; 705/26.7
See application file for complete search history.

(56) References Cited

U.S. PATENT DOCUMENTS

| | | |
|---|---|---|
| 5,802,516 A | 9/1998 | Shwarts et al. |
| 6,124,851 A | 9/2000 | Jacobson |
| 6,144,380 A | 11/2000 | Shwarts et al. |

(Continued)

OTHER PUBLICATIONS

Office Action for U.S. Appl. No. 14/203,302, dated May 6, 2015.
(Continued)

*Primary Examiner* — Thuy N Pardo

(57) ABSTRACT

Different computing methods and systems to at least compose at least a portion of a story are disclosed. In one embodiment, the story can be presented by an electronic device. The device can include a sensor to sense the user, and a processor. The processor can become aware of an attribute of the user. The story can depend on the attribute. In one embodiment, the attribute can be a behavior of the user. In another embodiment, the attribute can be a location of the user, or a social network of the user. The story can include a story theme and a non-story theme. The story theme can convey a concept, and the non-story theme can include scenes, scripts and/or props. The attribute can affect the story theme, the non-story theme, or both.

87 Claims, 5 Drawing Sheets

Related U.S. Application Data continuation of application No. 14/203,302, filed on Mar. 10, 2014, now Pat. No. 9,400,549.

(60) Provisional application No. 61/775,477, filed on Mar. 8, 2013.

(56) References Cited

U.S. PATENT DOCUMENTS

| | | | |
|---|---|---|---|
| 6,243,071 B1 | 6/2001 | Shwarts et al. | |
| 6,832,352 B1 | 12/2004 | Dooley | |
| 6,886,036 B1 | 4/2005 | Santamaki et al. | |
| 6,940,497 B2 | 9/2005 | Vincent et al. | |
| 7,287,220 B2 | 10/2007 | Kaasila et al. | |
| 8,423,889 B1 | 4/2013 | Zagorie et al. | |
| 8,434,001 B2 * | 4/2013 | Kandekar | G06F 40/169 715/234 |
| 8,478,662 B1 * | 7/2013 | Snodgrass | G06Q 30/00 705/26.7 |
| 8,743,021 B1 | 6/2014 | Park et al. | |
| 8,773,389 B1 | 7/2014 | Freed | |
| 8,826,169 B1 | 9/2014 | Yacoub et al. | |
| 8,941,677 B1 | 1/2015 | Hallenbeck | |
| 9,275,028 B2 | 3/2016 | Migos et al. | |
| 9,330,069 B2 | 5/2016 | Ho et al. | |
| 9,400,549 B2 | 7/2016 | Ho et al. | |
| 9,424,843 B2 | 8/2016 | Recker | |
| 9,430,141 B1 | 8/2016 | Lu et al. | |
| 9,491,365 B2 | 11/2016 | Ratcliff | |
| 9,495,344 B2 * | 11/2016 | Kandekar | G06F 16/345 715/753 |
| 9,569,549 B1 | 2/2017 | Jenkins et al. | |
| 9,628,707 B2 | 4/2017 | Blum et al. | |
| 9,635,222 B2 | 4/2017 | Blum | |
| 9,649,052 B2 | 5/2017 | Sales et al. | |
| 9,788,097 B2 | 10/2017 | Bullen et al. | |
| 9,823,494 B2 | 11/2017 | Blum et al. | |
| 9,848,260 B2 | 12/2017 | Conliffe | |
| 9,910,298 B1 | 3/2018 | Sales et al. | |
| 9,965,034 B2 | 5/2018 | Levesque et al. | |
| 10,215,568 B2 | 2/2019 | Klosinski, Jr. et al. | |
| 10,241,351 B2 | 3/2019 | Blum et al. | |
| 10,261,575 B2 | 4/2019 | Ho et al. | |
| 10,503,812 B2 | 12/2019 | Ho et al. | |
| 10,579,694 B1 * | 3/2020 | Jenkins | G06F 16/9537 715/753 |
| 10,606,346 B2 | 3/2020 | Ho et al. | |
| 10,831,982 B2 | 11/2020 | Ho et al. | |
| 2004/0140975 A1 | 7/2004 | Saito et al. | |
| 2004/0168126 A1 | 8/2004 | Dunietz et al. | |
| 2004/0205568 A1 | 10/2004 | Breuel et al. | |
| 2006/0031760 A1 | 2/2006 | Jacobs | |
| 2006/0075345 A1 | 4/2006 | Sherman | |
| 2006/0156256 A1 | 7/2006 | Lee | |
| 2006/0200752 A1 | 9/2006 | Sellers et al. | |
| 2007/0011607 A1 | 1/2007 | Lazareck et al. | |
| 2007/0043766 A1 * | 2/2007 | Nicholas | H04L 67/02 |
| 2007/0101263 A1 | 5/2007 | Bedingfield | |
| 2007/0171226 A1 | 7/2007 | Gralley | |
| 2007/0186007 A1 * | 8/2007 | Field | G06Q 30/02 709/233 |
| 2008/0168073 A1 | 7/2008 | Siegel et al. | |
| 2008/0268416 A1 | 10/2008 | Wallace et al. | |
| 2008/0298083 A1 | 12/2008 | Watson et al. | |
| 2009/0300539 A1 | 12/2009 | Hendricks | |
| 2010/0003659 A1 | 1/2010 | Edmonds | |
| 2010/0211866 A1 | 8/2010 | Nicholas et al. | |
| 2011/0102314 A1 | 5/2011 | Roux | |
| 2011/0119590 A1 | 5/2011 | Seshadri | |
| 2011/0167350 A1 | 7/2011 | Hoellwarth | |
| 2011/0175805 A1 | 7/2011 | Rottler et al. | |
| 2011/0261030 A1 | 10/2011 | Bullock | |
| 2011/0289395 A1 | 11/2011 | Breuel et al. | |
| 2012/0069131 A1 * | 3/2012 | Abelow | G06Q 10/067 348/14.01 |
| 2012/0084704 A1 | 4/2012 | Lee et al. | |
| 2012/0105460 A1 * | 5/2012 | Kim | G09B 5/062 345/501 |
| 2012/0127104 A1 | 5/2012 | Jeon | |
| 2012/0206472 A1 | 8/2012 | Kandekar et al. | |
| 2012/0210203 A1 * | 8/2012 | Kandekar | G06F 15/0291 715/230 |
| 2012/0303603 A1 | 11/2012 | Kim et al. | |
| 2013/0007603 A1 | 1/2013 | Dougherty et al. | |
| 2013/0012306 A1 | 1/2013 | Morin et al. | |
| 2013/0031208 A1 * | 1/2013 | Linton | G09B 7/02 709/217 |
| 2013/0104072 A1 | 4/2013 | Harvard | |
| 2013/0169546 A1 * | 7/2013 | Thomas | G06F 3/04883 345/173 |
| 2013/0174191 A1 * | 7/2013 | Thompson, Jr | H04N 21/4725 725/23 |
| 2013/0198642 A1 * | 8/2013 | Carney | H04N 21/482 715/738 |
| 2013/0227401 A1 * | 8/2013 | Kandekar | G06F 40/169 715/254 |
| 2013/0329183 A1 | 12/2013 | Blum et al. | |
| 2014/0089775 A1 * | 3/2014 | Worsley | G06F 16/27 715/230 |
| 2014/0172418 A1 | 6/2014 | Puppin | |
| 2014/0210855 A1 | 7/2014 | Cohen | |
| 2015/0002372 A1 | 1/2015 | Ortega et al. | |
| 2015/0026176 A1 | 1/2015 | Bullock | |
| 2015/0066648 A1 | 3/2015 | Kane, Jr. et al. | |
| 2015/0073907 A1 | 3/2015 | Purves et al. | |
| 2015/0120180 A1 | 4/2015 | Park et al. | |
| 2015/0160699 A1 | 6/2015 | Choi et al. | |
| 2015/0188997 A1 | 7/2015 | Park et al. | |
| 2015/0220205 A1 | 8/2015 | Yun | |
| 2016/0004426 A1 | 1/2016 | Ishibashi | |
| 2016/0109936 A1 | 4/2016 | Lee | |
| 2016/0203109 A1 | 7/2016 | Ho et al. | |
| 2016/0203110 A1 | 7/2016 | Ho et al. | |
| 2016/0306419 A1 | 10/2016 | Ho et al. | |
| 2016/0343037 A1 * | 11/2016 | Nicholas | H04L 67/02 |
| 2018/0047072 A1 * | 2/2018 | Chow | G06Q 30/0263 |
| 2018/0158460 A1 | 6/2018 | Lee et al. | |
| 2018/0196870 A1 | 7/2018 | Mukherjee | |
| 2019/0204908 A1 | 7/2019 | Ho et al. | |
| 2020/0014744 A1 * | 1/2020 | Nicholas | H04L 67/02 |
| 2020/0089739 A1 | 3/2020 | Ho et al. | |
| 2020/0356228 A1 * | 11/2020 | Carney | H04N 21/8455 |
| 2021/0150123 A1 | 5/2021 | Ho et al. | |

OTHER PUBLICATIONS

Office Action for U.S. Appl. No. 14/203,302, dated Aug. 26, 2015.
Advisory Action for U.S. Appl. No. 14/203,302, dated Nov. 24, 2015.
Ex Parte Quayle Action for U.S. Appl. No. 14/203,302, dated Feb. 10, 2016.
Notice of Allowance for U.S. Appl. No. 14/203,302, dated Apr. 20, 2016.
Office Action for U.S. Appl. No. 15/193,463, dated Mar. 8, 2018.
Office Action for U.S. Appl. No. 15/193,463, dated Jun. 21, 2018.
Notice of Allowance for U.S. Appl. No. 15/193,463, dated Aug. 10, 2018.
Ex Parte Quayle Action for U.S. Appl. No. 15/193,463, dated Nov. 13, 2018.
Notice of Allowance for U.S. Appl. No. 15/193,463, dated Feb. 11, 2019.
Office Action for U.S. Appl. No. 16/299,863, dated Apr. 1, 2019.
Notice of Allowance for U.S. Appl. No. 16/299,863, dated Jun. 10, 2019.
Notice of Allowance for U.S. Appl. No. 16/299,863, dated Aug. 13, 2019.
Notice of Allowance for U.S. Appl. No. 16/299,863, dated Nov. 18, 2019.
Office Action for U.S. Appl. No. 15/079,832, dated Oct. 4, 2017.
Office Action for U.S. Appl. No. 15/079,832, dated Feb. 5, 2018.
Office Action for U.S. Appl. No. 15/079,832, dated May 16, 2018.

(56) References Cited

OTHER PUBLICATIONS

Notice of Allowance for U.S. Appl. No. 15/079,832, dated Oct. 24, 2018.
Notice of Allowance for U.S. Appl. No. 15/079,832, dated Feb. 21, 2019.
Notice of Allowance for U.S. Appl. No. 15/079,832, dated May 29, 2019.
Notice of Allowance for U.S. Appl. No. 15/079,911, dated Jan. 4, 2018.
Notice of Allowance for U.S. Appl. No. 15/079,911, dated Apr. 18, 2018.
Notice of Allowance for U.S. Appl. No. 15/079,911, dated Jul. 30, 2018.
Notice of Allowance for U.S. Appl. No. 15/079,911, dated Sep. 17, 2018.
Notice of Allowance for U.S. Appl. No. 15/079,911, dated Nov. 20, 2018.
Notice of Allowance for U.S. Appl. No. 15/079,911, dated Jan. 3, 2019.
Lamkin, Paul. "Mircrosoft's headset for the visually impaired gets voice controls," Wearable News, http://www.wareable.com/wearable-tech/microsoft-bone-conduction-headset-for-the-blind-448, Dec. 1, 2015.
"Headset Creates 'Soundscape' for Blind People to See," Live Science, http://www.livescience.com/21437-headset-creates-soundscape-blind-people.html, Jul. 6, 2012.
Duffy, Maureen. "Google Glass Applications for Blind and Visually Impaired Users," VisionAware, http://www.visionaware.org/blog/visionaware-blog/google-glass-applications-for-blind-and-visually-impaired-users/12, Aug. 5, 2013.
Notice of Allowance for U.S. Appl. No. 15/079,832, dated Nov. 18, 2019.
Notice of Allowance for U.S. Appl. No. 15/079,832, dated Jan. 23, 2020.
Notice of Allowance for U.S. Appl. No. 15/079,832, dated May 18, 2020.
Notice of Allowance for U.S. Appl. No. 15/079,832, dated Aug. 18, 2020.
Notice of Allowance for U.S. Appl. No. 15/079,832, dated Sep. 14, 2020.
Notice of Allowance for U.S. Appl. No. 15/079,911, dated Aug. 12, 2019.
Notice of Allowance for U.S. Appl. No. 16/692,101, dated Aug. 18, 2020.
Notice of Allowance for U.S. Appl. No. 15/079,911, dated May 8, 2019.
Notice of Allowance for U.S. Appl. No. 16/692,101, dated Nov. 25, 2020.
Notice of Allowance for U.S. Appl. No. 16/692,101, dated Jan. 4, 2021.
Notice of Allowance for U.S. Appl. No. 17/060,676, dated Mar. 31, 2021.
Notice of Allowance for U.S. Appl. No. 17/060,676, dated Jun. 1, 2021.
Notice of Allowance for U.S. Appl. No. 16/692,101, dated Apr. 15, 2021.
Notice of Allowance for U.S. Appl. No. 16/692,101, dated May 13, 2021.

* cited by examiner

METHOD AND APPARATUS TO COMPOSE A STORY FOR A USER DEPENDING ON AN ATTRIBUTE OF THE USER

CROSS-REFERENCE TO RELATED APPLICATIONS

This application is a continuation of U.S. patent application Ser. No. 16/299,863, filed on Mar. 12, 2019, entitled "Method and Apparatus to Compose a Story for a User Depending on an Attribute of the User," which is hereby incorporated herein by reference, and which application is a continuation of U.S. patent application Ser. No. 15/193,463, filed on Jun. 27, 2016, now U.S. Pat. No. 10,261,575, entitled "Method and Apparatus to Tell a Story That Depends on User Attributes," which is hereby incorporated herein by reference, and which application is a continuation of U.S. patent application Ser. No. 14/203,302, filed on Mar. 10, 2014, now U.S. Pat. No. 9,400,549, entitled "Method and System for a New-Era Electronic Book," which is hereby incorporated herein by reference, and which application claims the benefit of U.S. Provisional Patent Application No. 61/775,477, filed Mar. 8, 2013, and entitled "Method and System for a New-Era Book," which is hereby incorporated herein by reference.

BACKGROUND OF THE INVENTION

Description of the Related Art

Before human invented written languages, they told stories verbally. Typically, these stories captured important information, such as significant events, major historical developments, technological breakthroughs and other types of knowledge. It is not uncommon to use these stories to teach the next generation and to instill moral values. Such methods lasted for many millenniums. Perhaps we can call this the folklore era.

Then our ancestors invented written languages. They captured the stories in written words, and preserved them through different media, such as tortoise shell, papyrus, slates, bamboos, and later paper. We can call this the writings era.

During the writings era, one medium of particular significance is paper. Before the invention of the printing press, only the elites had access to writings on paper. Through the printing press, stories were put onto paper much more quickly and easily. The printing press instantly enabled massive story distribution to the general public.

Other than paper, over the course of the writings era, many different formats of storytelling have been developed. For example, our ancestors embedded stories into songs, pictures, puppet shows and operas. Powerful body languages and highly-expressive theatrical props were used to engrave images of the stories into our minds. Then, about a century ago, the movie industry came. Quickly, movies have become a dominant force in storytelling.

Separately, the era of inexpensive computing devices also has arrived. These devices have proliferated extensively to the general public. Now, an entire library of stories can be at our fingertips. We can read digitized articles, documents and books; listen to audio books, music and songs; and watch operas and movies, practically anywhere, anytime.

With all these explosive changes, one area has stayed relatively unchanged—the area of books.

For books, we are practically still in the writings era, a period that has lasted for over three thousand years. As an example, to educate students, teachers in schools still practice the folklore method of telling stories verbally, using paper textbooks to enhance the message.

It should be apparent from the foregoing that there is a need for books to move to a new era, where information can be created and conveyed to the audience more effectively, in ways very different from the folklore era and the writings era.

SUMMARY OF THE INVENTION

In one embodiment, a new-era book in a new-era book device actively interacts with its audience. During the writings era, readers passively and patiently receive information. They could be reclining on a sofa to read the book, or sipping wine in a bathtub while listening to a story. Though enjoyable, they could not interact with the story. In this embodiment, the new-era book in the new-era book device could actively interact with the audience. Such interactions could enhance the learning experience.

In one embodiment, a new-era book device can provide content of a new-era book to a user or a learner. The device can include a display to present the content to a user; a sensor to sense the user; and a processor. The processor can become aware of an attribute of the user, and change a portion of the content of the book to be presented accordingly. In one embodiment, the attribute is a behavior of the user. In another embodiment, the attribute can be a location of the user, or a social network of the user. The book can include a story and a non-story theme. The story theme can convey a concept, and the non-story theme can include scenes, scripts and/or props. The portion changed can be the story or the non-story theme, or both.

In one embodiment, a new-era book in a new-era book device could dynamically monitor and react to a learner's emotion or behavior, such as reacting to the learner's feelings (e.g. frustration, happiness, impatience, anger, and/or apathy), psychological changes, physical changes, understanding or insights, and/or attention span, as the learner is going through the book. The reactions by the book can be in different forms. For example, the new-era book could adjust what is going to be presented based on the monitored information. As the behavior of the learner changes, the story dynamically evolves. Thus, for the same learner, the story could be different from one time frame to the next, or from one geographic location to another.

In one embodiment, the presentation of a new-era book in a new-era book device depends on certain background and/or experience of a learner. For example, the story could depend on the learner's cultural, educational, social, demographic, and/or economic background. Depending on the identity of the learner, the new-era book could include or provide different materials, such as different characters, in different outfit, or avatar.

The presentation could depend on temporal events related to the learner, which could be current events or regional information. By adjusting the story according to global and/or local events around the learner, the learner could better understand or identify with the story and/or the outside world.

In one embodiment, the presentation could be modified by the learner. A new-era book could allow the learner to change the story. For example, a learner could pick an identity to represent him/herself in the learning process. This could be an avatar to represent the learner. In another example, the learner could modify a scene to change the look of a character in a story, the tools used by a character, the capabilities of a character, or other attributes of a character. In yet another example, a new-era book could request a response from the learner regarding certain developments of the story. The new-era book device could provide a few responses for the learner to select. The story could change based on the learner's selection. In another example, a new-era book device could let the learner know the typical selection. This typical selection could be dynamic. For example, the new-era book device could be connected to a network and could get information dynamically regarding selections from other users to determine the typical one.

In one embodiment, the different changes and/or adaptation of a new-era book could be triggered at the beginning when the learner starts to go through the book. In another embodiment, the change is based on location. For example, the learner travels from San Francisco to Tokyo. Upon arrival at Tokyo, some of the contents in the book change dynamically from United States scenes to Tokyo scenes. In another example, after the learner has arrived at Tokyo, the new-era book device could ask the learner if the learner prefers scenes in the book to change in view of the new locale. Depending on the learner's response, the content of the new-era book adapts accordingly. Another trigger of the change could be based on time. For example, if the learner's location has changed dramatically within a short duration of time, such as 48 hours, the content would not dynamically change.

In one embodiment, there could be a person overseeing the learning process. For example, there could be a number of students, each with a new-era book in a new-era book device. And a teacher could be in the midst to further help the students to go through the story.

In one embodiment, a new-era book includes a book package including a description (or script), with a collection of rich media components, such as images, animations, movies, audios, executable code, and text. The script could be created in a new-era book descriptive language.

To implement the different embodiments, in one approach, a new-era book device includes different sensors, such as one or more imaging sensor(s) such as camera(s), audio sensor(s), spatial sensor(s) such as accelerometer(s) and gyroscope(s), and/or touch sensor(s). With the one or more different sensors, a new-era book device could capture and analyze different human behaviors, volitional and others, including human psychological symptoms, physiological aspects, emotion, physical motions, facial expression, gestures, voice and/or speech recognition, audio recognition, and/or other forms of human communication.

In different embodiments, a new-era book device could be implemented in the format of a television set, tablet, smartphone, laptop, personal computer, or other types of portable, handheld, and/or non-portable electronic devices.

In one embodiment, a new-era book device downloads a new-era book player and a book package. Then the new-era book device installs the book player and the book package. After the installation, the new-era book device could start the book player to play the book package. As the learner continues to go through the book, the book player keeps tracking and storing the learner's learning progress and process into a storage device, which could be in the new-era book device. The book player also determines what is to be presented to the learner depending on the information tracked and analyzed by the book device. In one embodiment, a new-era book player could be combined with a book package. In another embodiment, a new-era book player is incorporated in a new-era book device.

Other aspects and advantages of the present invention will become apparent from the following detailed description, which, when taken in conjunction with the accompanying drawings, illustrates by way of example the principles of the invention.

Figure 1:
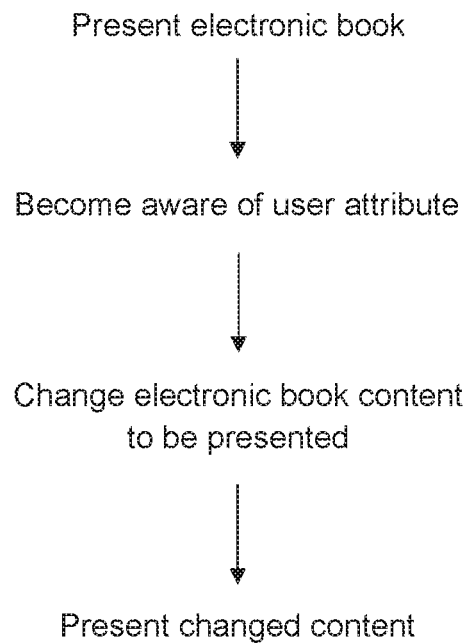
FIG. 1 shows one embodiment of a method on presenting an electronic book according to the present invention.
Figure 2:
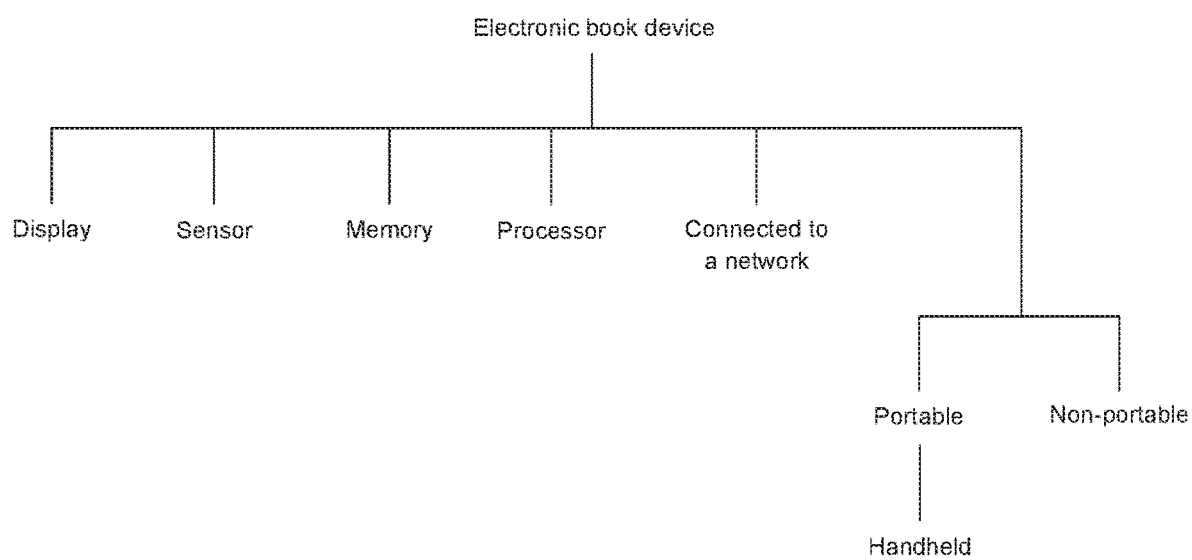
FIG. 2 shows different embodiments of an electronic book device according to the present invention.
Figure 3:
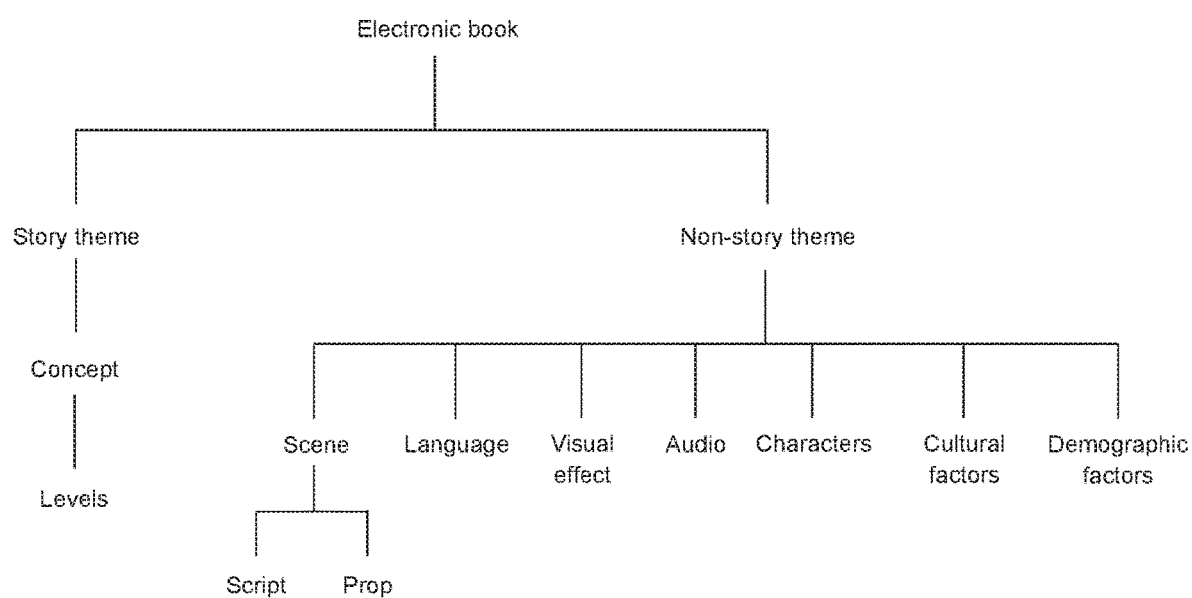
FIG. 3 shows different embodiments of an electronic book according to the present invention.
Figure 4:
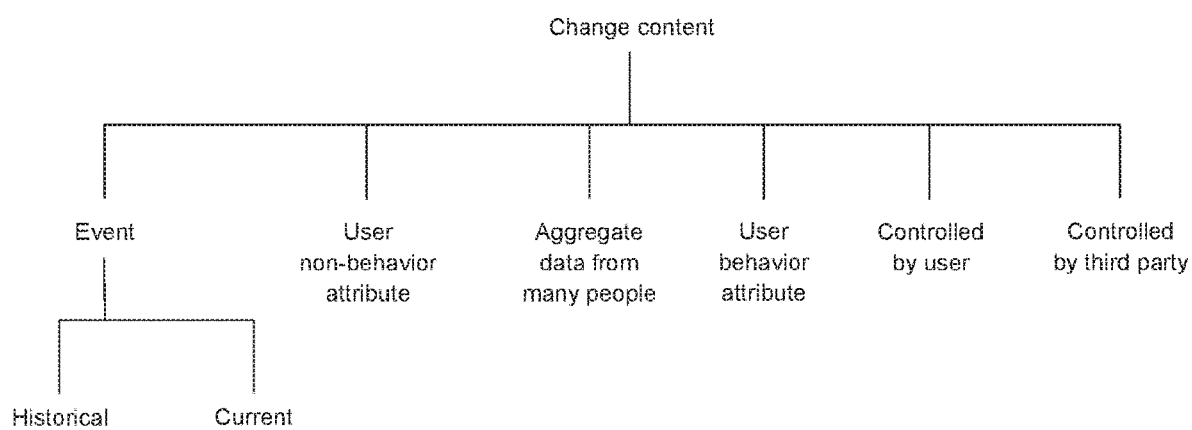
FIG. 4 shows different embodiments on changing the content of an electronic book according to the present invention.
Figure 5:
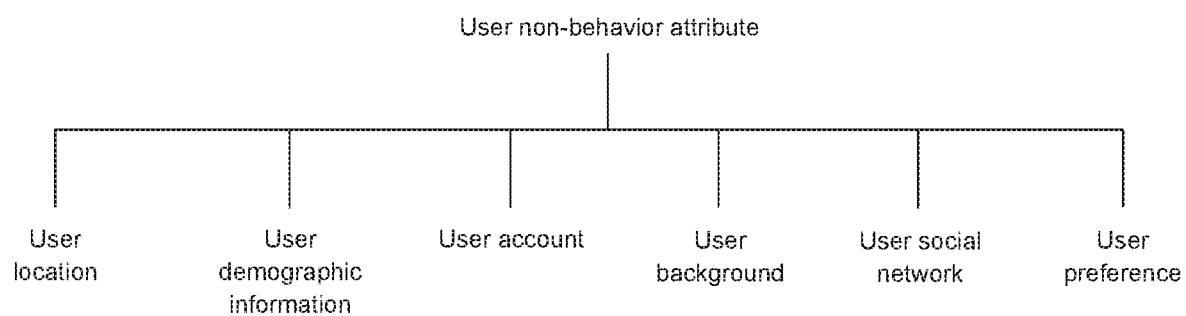
FIG. 5 shows different embodiments on user non-behavior attributes according to the present invention.

Same numerals in FIGS. 1-5 are assigned to similar elements in all the figures. Embodiments of the invention are discussed below with reference to FIGS. 1-5. However, those skilled in the art will readily appreciate that the detailed description given herein with respect to these figures is for explanatory purposes as the invention extends beyond these limited embodiments.

DETAILED DESCRIPTION OF THE INVENTION

In different embodiments, a new-era book employs different approaches to enhance the learning experience of a learner or user.

In one embodiment, a new-era book is an electronic book. The electronic book includes the concept of pagination, or electronic pages. The pages could include animations, movie clips and audio clips. The pages are connected together virtually or digitally. This allows a learner or user to go through the materials in a sequential manner, from one page to the next.

In one embodiment, a new-era book includes computer instructions, which, when executed by a new-era book device, result in the device presenting materials for the learner, changing the materials in view of an attribute of the learner, and interacting with the learner. The materials that change could include computer-generated animation.

In one embodiment, a new-era book includes at least one story theme and at least one non-story theme. For example, a story theme covers a story line, a broad idea or message conveyed by the new-era book; and a non-story theme includes different techniques to present the story theme. To illustrate, a cultural setting can be a non-story theme. A gesture could be another non-story theme. A gesture could have different meaning in different culture, such as shaking head meaning yes in India and no in the United States, while a slight head nodding meaning no in Turkey and yes in the United States.

In the new-era book, a non-story theme could play an important role. With Martin Luther King's famous speech, "I have a dream", as an example, the story theme could be the speech itself. There could be different non-story themes. The speech could be presented in a backdrop of Washington Monument in front of a million people; or the speech could be presented by a student in a classroom in front of twenty third graders. The two different non-story themes could convey significantly different messages to a learner. As another example of different non-story themes, the speech could be given in Chinese with a backdrop of the Forbidden City, in front of hundreds of thousands of people in Tiananmen Square; or the speech could be given in Arabic with a backdrop of the Great Sphinx, in front of hundreds of thousands of people in Tahrir Square. Such changes in context based on national demographic changes again could convey different messages to a learner.

In one embodiment, a new-era book does not have an explicit story theme, or idea. For example, the book includes a non-story theme of visual works, such as beautiful and peaceful sceneries.

In one embodiment, a story theme can be designed to convey a concept to the learner. The story theme could have a number of levels, with at least one level selected based on an ability of the learner, to convey the concept. The new-era book could allow the learner to advance to a higher level, or to go back to a lower level. Level advancement could motivate the learner because the learner could feel more satisfied by completing a level, gaining additional experience. These levels could be dynamically selected by the new-era book device depending on the strengths and weaknesses of the learner. The selected level should not be too easy to become dull, or too difficult to discourage the learner. Such tracking of the learner and tailoring of materials could be accumulative across many learning sessions.

A story theme of a new-era book could include repeating a learning process. For example, a concept is conveyed via repeating the presenting of a set of materials, which could include presenting a small task to be accomplished repeatedly. Such a process can enable the learner to practice and perfect a specific skill.

Another story theme of a new-era book could include reward(s) for the learner. For example, a concept can be conveyed via a new-era book device that provides a reward for certain accomplishment. The reward could be made public. Such glamour and benefits of making public could further enable the learner to learn.

In one embodiment, a non-story theme could represent ways to present a story theme.

In one embodiment, a non-story theme includes scenes. Each scene could be a page or an electronic page, including a script with props and/or actors, where animations and/or actors could interact with the learner.

In one embodiment, a non-story theme includes visual effect. One visual effect includes color scheme or blending. Another visual effect could include animation. The animation could include motion path, rotation, positioning, layer transformation, transparency, color transformation, image transformation, and speed. A visual effect could include images and/or pictures, with illustrations and/or rich text. Another visual effect could include videos.

In one embodiment, a non-story theme includes audios, such as sound effect, music, songs, and speeches.

In one embodiment, a non-story theme includes characters. Each character could have a certain appearance, and/or using one or more tools, and/or with one or more capabilities.

In different embodiments, non-story themes could include props, backdrops, cultural factors, different languages to be used for a story theme, and/or one or more demographic factors.

In one embodiment, a non-story theme could include different types of rewards. Rewards could be tailored to the learner. The tailoring could be accumulative across many sessions. In another example, a reward can be psychological. For example, a learner is represented by an avatar, and the book could promote the avatar or the identity of the learner as a reward.

In one embodiment, a non-story theme includes surprises. As the learner is going through materials in the new-era book, there could be pleasant surprises such as gems and specialty items allowing the learner to accidentally discover. The surprise could enhance the learning experience.

In one embodiment, a new-era book includes a book player. In another embodiment, a book player is included in a new-era book device.

Regarding a new-era book device, the device could be connected to a network. The network could be a physical network, such as WiFi network, Bluetooth network, local area network, wide area network and the like.

In one embodiment, the network is a social network. Via such a network, the new-era book device could become aware of information from many learners regarding the new-era book.

In one embodiment, a new-era book device includes one or more sensors. For example, the device includes imaging sensor(s) such as camera(s), audio sensor(s), touch sensor(s), and/or spatial sensor(s), such as one or more accelerometer(s), and/or one or more gyroscope(s).

In one embodiment, the new-era book device includes one or more processors. The one or more processors could include graphic processing capability, which could include real-time video and/or audio encoding/decoding capabilities to, for example, decode multiple video streams.

In one embodiment, the new-era book device includes at least an electronic storage to store materials, such as location, demographic information, and preferences of the learner. The storage could also store behaviors of the learner as the learner is going through materials in the new-era book. Such tracking and storage of the learner behavior could be made available for analysis.

In one embodiment, the new-era book device includes one or more displays.

In different embodiments, the new-era book device could be a portable, a handheld, or a non-portable device. The device could be a TV, a tablet, a smartphone, a laptop, a personal computer or other type of electronic device.

In different embodiment, the new-era book device could monitor or be aware of different attribute(s) of the learner. This could be based on the one or more sensors of the new-era book. Different attributes that could be monitored or be aware of include mental attributes, physiological aspects, different behaviors and different learner profiles. Examples of monitoring different behaviors of a learner could be found in U.S. Pat. No. 8,398,407, entitled, "Learning Method and System in a Window Environment" which is incorporated herein by reference.

In one embodiment, one mental attribute being monitored or being made aware of by a new-era book device is related to a feeling of the learner, such as apathy, impatience, frustration, anger, and happiness. Another mental attribute is related to the attention span of the learner. Yet another mental attribute is related to an understanding in certain materials presented to the learner.

In one embodiment, one physiological aspect being monitored or being made aware of includes breathing of the learner.

A behavior of the learner being monitored or being made aware of could be a voluntary behavior of the leaner. This could include a physical movement of the learner, a gesture of the learner, a facial expression of the learner, a voice/ speech of the learner, and/or a touch by the learner, such as to a new-era book device.

Another type of voluntary behavior being monitored or being made aware of includes a behavior of the learner in going through the material presented by the device. This could include the speed of the learner in going through the materials.

In one embodiment, the new-era book device could monitor or be aware of an involuntary behavior of the learner, such as the heartbeat of the learner.

In different embodiment, the new-era book device could monitor or be aware of one or more profiles of the learner. One profile of the learner is the learner's identity, which can be an avatar representing the learner. The learner's identity and/or the avatar could be changed by the learner.

In one embodiment, a profile of the learner being monitored or being made aware of is related to location. For example, the profile is related to a history of the locations that the learner has been to, within a preset range of time, such as for the last month. The location could be identified by or from the new-era book device, such as based on the IP address of the device. Such a process is sometimes known as IP geo-location.

In one embodiment, a profile of the learner being monitored or being made aware of is related to a background of the learner. The background could be related to a cultural, educational, social, demographic and/or economic background of the learner.

In one embodiment, a profile of the learner being monitored or being made aware of is related to a preference of the learner.

In one embodiment, a profile of the learner can be accessed from another entity. For example, a profile can be accessed from social network(s), advertisement network(s), schools, corporate and/or institutional networks, and/or an account of the learner, e.g. Android, Apple, Facebook account. The account could be with a social media service, such as google+, Microsoft messenger, or Apple Facetime. In one embodiment, accessing a profile of the learner from another entity requires a permission from the learner. In another embodiment, accessing does not require any permission from the learner.

In one embodiment, the new-era book device could monitor or be aware of events, such as a historical event, a current event, a local event, an event outside of the local area of the learner, and/or a global event.

In one embodiment, the new-era book device could change a story theme, a non-story theme, and/or a representation of the learner. The change could be controlled at least by the learner, a third party, an event, and/or many learners.

The learner could control the change in different ways. For example, the new-era book could allow the learner to be in the driver seat to navigate the learning experience. To illustrate, a number of change options could be provided for the learner to select. The book would proceed based on the learner's selection.

The new-era book could allow the learner to set the learning pace. For example, the learner could pause, review, and continue with material presentation. Sometimes the learner like to pause, review what the learner has achieved, go back and repeat a past experiences, before continuing on with the learning journey.

In one embodiment, the change could be controlled at least by a third party. The third party could be an author of at least some of the materials presented to the learner, a publisher of at least some of the materials presented to the learner, and/or an app store. In another example, the third party could be a person monitoring at least a portion of the learning process of the learner, as the learner is going through the new-era book. The person could be a teacher of the learner.

In one embodiment, the change could be controlled at least by many other learners. For example, information regarding many learners can be aggregated to help determine the change. In another example, information regarding many learners can be aggregated and provided to the learner, such as to help the learner determine the change.

In one embodiment, the new-era book device help set the time to change a story and/or a non-story theme. The change could be dynamic. For example, changes could occur as the learner is going through materials presented to the learner by the device.

In another embodiment, changes occur when the learner starts to go through the new-era book. For example, the beginning of the book is when changes occur. Then as the learner goes through materials from the book, materials in the book remain stable.

In one embodiment, the time to change is set by an author of at least some of the materials of the new-era book, and/or the publisher of at least some of the materials of the new-era book.

In another example, the time to change depends on the location of the learner or the new-era book device. The new-era book device could include a GPS receiver to help determine its position. To illustrate, at least one change occurs if the learner moves beyond a preset threshold, such as from one country to another country. In another example, the at least one change does not occur if the learner moves beyond the preset threshold within a preset time frame. Assume the learner is going through the new-era book while flying on a plane, and the trip is from New York to Cairo, Egypt. Within 12 hours, the learner reaches Cairo. In one embodiment, the at least one change does not occur if the learner moves for such distances within 48 hours. This could prevent changes to occur while the learner is right in the middle of going through something very interesting in the book. In one embodiment, the new-era book would ask for learner permission before changing.

In one embodiment, a new-era book device analyzes a behavior of the learner in going through materials presented to the learner. The device monitors and keeps track of one or more behaviors of the learner as the learner is going through the materials. Such tracked information is subsequently analyzed for analytics of learner behavior in going through the materials.

To illustrate, based on the monitored information, the device could become aware of the specific area the learner spends a lot of time on. For example, the learner could go back to the area multiple times within a short time frame. Such tracked information could provide an indication as to the learner's preference. In the future, the new-era book could provide additional coverage to similar areas in the book. Or, the book could progress in different possible paths, and the paths closer to the learner's preference would be selected. In another example, if there are products and/or services that fit into the learner's preference, the device could ask the learner if the learner would like to be aware of such products and/or services.

In different embodiments, such tracked information can be analyzed by the new-era book device, and/or by another device. The another device could be wirelessly coupled and/or coupled by wire to the new-era book device.

One example of a new-era book is titled, "Three Little Poodles." It is a story based on the Three Little Pigs. In the story, the mother poodle advised the three poodles to seek new homes. Seeing a girl carrying straws, the first poodle asked for the straws to build a straw house. Seeing a boy carrying sticks, the second poodle asked for the sticks to build a stick house. Seeing a gardener rolling a cart of bricks, the third poodle asked for the bricks to build a brick house. After each house was built, a big dog came by and destroyed it.

In this story, one non-story theme is framed in an American sub-urban setting. In the beginning, the poodles lived with their mother in a backyard. They encountered their supplier of building materials on a street, and built their new homes in a garden setting.

In another non-story theme, the Three Little Poodles has 16 scenes, each including a sub-plot explaining the poodle actors, the human actors or the dog actor. Each scene is filled with selectable and non-selectable animations to assist the storytelling. Text is animated as well to assist the learner to read aloud.

The above non-story themes include the three poodles, the dog, and the human actors; the backyard, the street, the garden, and the inside of the brick house. Props of the non-story themes include the house, various items on the street, and various items of the houses.

There could be different variations to the non-story themes. For example, there could be an urban setting with different backdrops or a country side setting. The poodles and the human could vary, such as a female poodle of a different race in different types of clothing. There could be different props for the street such as different cars; different house props; different animations describing how the big dog destroys the houses; different interior views of the brick house; and different languages used for the text.

These different non-story themes could be set by the author(s), the book publisher, and/or an app store. The decisions could be based on their client preferences or their own preferences. For example, an app store wants to push BMW cars. Whenever there are scenes showing cars prominently, there will be a BMW car. In another example, a learner is interested in Volvo cars. If the decision is based on the learner's preference, a Volvo car would be selected instead.

In different embodiments, different non-story themes could be automatically selected based on, for example, the location and/or other learner information. To illustrate, if the learner is a Chinese, the book automatically changes to a Chinese non-story theme, though the story line or story theme remains the same.

Another example of a new-era book is titled, "Cavern Math." It is a Math exercise book series. For example, Cavern Math 3 covers $3^{rd}$ grade mathematics, with 12 books, each covering a section of the $3^{rd}$ grade mathematics curriculum. These could be considered story themes of the book. Each Cavern Math 3 book includes a number of topics, such as 16, organized in a hierarchical way. Examples of a hierarchy of Math topics could be found in U.S. Pat. No. 5,779,486, entitled, "Methods and Apparatus to Assess and Enhance a Student's Understanding in a Subject," which is incorporated herein by reference. Each topic could include a number of exercises. There could be exercises to review prior topics. Examples of reviewing topics could be found in U.S. Pat. No. 5,863,208, entitled, "Learning System And Method Based on Review," which is incorporated herein by reference. Results and scores in working through the exercises could be accumulated, with achievement levels calculated. Examples of different assessment techniques could be found in U.S. Pat. No. 5,779,486, entitled, "Methods and Apparatus to Assess and Enhance a Student's Understanding in a Subject," which is incorporated herein by reference.

For illustration purposes, a non-story theme in Cavern Math 3.2, one of the Cavern Math books, composes backdrop and various animating actors and props for visual enrichment, an actor to determine achievement level and to display the achievement, an actor to show additional learning material to assist the learner, an actor to navigate the topics, and an actor to present rewards based on the achievement. Additional learning materials can be presented as videos, such as videos from Khan's Academy.

There could be other story and non-story themes for Cavern Math 3.2. For example, there could be backdrop and visual effects tailored for different learners; different mix of topics and exercises for different learners, such as advance learners, remedied learners, and learners from different states and school districts; different navigation to address different hierarchy of the topics; different achievement computation based on different targeted readers; and different materials to help learning, such as Chinese version of videos, and a different set of videos from different publishers. The above examples illustrate the mingling of story and non-story themes in a new-era book.

Each of the Cavern Math books could provide a reward. Upon completion of all Cavern Math 3 books in the series, there could be a grand reward based on the accumulated achievements in the series. There could be different rewards based on different themes from different publishers. In one example, the reward is Tai-Chi 13 styles. Book 1's reward is Kung Fu Panda playing an animation of Tai-chi style 1, Book 2 playing style 2, and so on. Upon completion of the entire series, the grand reward is style 13, and Po in Kung Fu Panda will play all 13 styles in a single video/animation, instead of the 13 individual video/animation clips. If the achievement level is higher, the grand reward could include Shi-Fu playing the 13 styles. For the highest achievement, the grand reward includes Master Wu-Gui playing the 13 styles.

In one embodiment, a book description language could specify a number of scenes or pages, where a scene can transition to another scene automatically or through learner interaction. For example, scenes are rendered accordingly as they are listed in the new-era book, or a scene can direct to another scene according to learner interaction.

In different embodiments, the terms, user and learner, are used interchangeable.

In different embodiments, examples of different implementations of a book description language are shown below. In the following, the term, theme, typically refers to a non-story theme:

Book XML tag <book/>

Scene is an XML tag (<scene/>)

A scene is composed of a backdrop (<backdrop/>), a collection of objects such as props (<prop/>) and actors (<actor/>), and a collection of animations grouped under <animations/>. A special type of prop is rich text boxes (<text/>).

Display onto the screen is a viewable portion of the scene (<view/>).

Backdrop (<backdrop/>) defines the backdrop/background of a scene. Props and actors are positioned in the scene on top of the backdrop. To provide 3-D look, the scene supports layers. Objects positioned on the higher layer are shown on top of objects in lower layer. Objects can be transparent.

A prop (<prop/>) is a still image.

An actor (<actor/>) is an independent piece of software or movie which may have its own interaction with learner.

An animation (<animation/>) specifies a learner interaction and/or animation of a prop or an actor.

An animation is triggered typically through:

Automatically at beginning of a scene when a scene is rendered

Together with a previous animation

After a previous animation

Upon a learner gesture input. The book description language supports touch gestures. Image gestures are processed by actors, which can generate events based on image-based gestures. Similarly voice or audio gestures or recognition can be done.

Actor-generated events.

An animation can

Animate a prop according to animation schemes such as motion path, rotation, positioning, layer transformation, transparency, color transformation, image transformation.

Run a sub-movie of an actor (for example, a dog running)

Play a movie or video

Initiate an event for one or more actors

Go to another scene

Combination of above actions.

In the above example, a scene is a script composing the props and actors. The animations and actors together provide interactions with the learner, who could render the scene.

A theme can be specified in a <themes/> tag. The following illustrates examples of multiple automatic themes.

```
<themes>
    <theme id="country-usa"> <!--American theme -->
        <objects>
            ...
            <object type="actor" objid="poodle" >
                <src url="media/common/a_Lasso_usa.swf"/>
            </object>
            ...
        </objects>
    </theme>
    <theme id="country-china"> <!--Chinese theme -->
        <objects>
            ...
            <object type="actor" objid="poodle" >
                <src url="media/common/a_Lasso_china.swf"/>
            </object>
            ...
        </objects>
    </theme>
    <theme id="country-italy"> <!--Italian theme -->
        ...
    </theme>
    <theme id="area-urban"> <!--Urban theme -->
        ...
    </theme>
    <theme id="area-country-side"> <!--Country side theme -->
        ...
    </theme>
    <theme id="gender-boy"> <!--Boy's theme -->
        ...
    </theme>
    <theme id="gender-girl"> <!--Girl's theme -->
        ...
    </theme>
    <theme id="age-kids"> <!--Kids 3-8 theme -->
        ...
    </theme>
    <theme id="age-teens"> <!--Teens 13-18 theme -->
        ...
    </theme>
</themes>
```

A book player could obtain or determine on/from the device when the software starts a record to be called "global://UserProfile", which associates with the following XML structure:

```
<UserProfile>
    <Location>
        <Country>usa</Country>
        <Area>urban</Area>
    </Location>
    <Age>
        <Age>8</Age>
        <AgeGroup>kids</AgeGroup/>
        <Birthdate>December 5, 2002</Birthdate>
    </Age>
    <Gender>girl</Gender>
    <Names>
        <Name id="kitty562" social="Facebook"/>
        <Name id=98120874" social="Schoology"/>
        <Name id="kitty.smith.34" social="Skype"/>
        <Name id="kitty12345@gmail.com" social="Email" />
        <Name id="UDID56901234974" social="iPad"/>
    </Names>
    <Likes>
        <Food>Chinese, Pizza, Pretzel, Pasta, Grapes, Oranges</Food>
        <Games>Bejewel 2, Plants vs Zombies</Games>
    </Likes>
    <TimeLines>
        <TimeLine place='San Francisco" date="Jan 13, 2009" time="14:25 - 15:46" social="Facebook"/>
        <TimeLine place="Pizza My Hut, Los Gatos" date="Mar 21, 2010" time="17:46 - 19:22" social="FourSquare"/>
    </TimeLines>
    <Friends>
        <Friend id="joe1245" social="Facebook"/>
        <Friend id="Fred98013" social="Facebook"/>
        <Friend id="jane.smith.289" social="Skype"/>
    </Friends>
</UserProfile>
```

A new-era book player could obtain the above UserProfile by:

Obtaining device id (UDID) of the book device and looks up user information by searching for UDID using a 3$^{rd}$ party user profile service (such as Ad networks). Location information can be the last location where the user checks in, or the last location where the user uses a social media website.

Obtaining an account information of the book device (Android, Apple and Microsoft tablets/phones all require an account). Then looking up user information using the appropriate social media services (google+, Microsoft messenger, Apple Facetime etc.)

Obtaining a login information from the user, such as a Facebook login. Consult corresponding social media services for information.

Obtaining a location from the device.

Obtaining an IP address from the device and looking up the location of IP address, such as through IP geo-location.

A new-era book could determine the <theme> to use by using the following code:

```
<testset>
    <test "global://UserProfile/Location/Country" equal "usa"/>
    <set theme="country-usa"/>
</testset>
or
<testset>
    <test "global://UserProfile/Age/AgeGroup" equal "kids"/>
    <set theme="age-kids"/>
</testset>
```

As the learner renders a scene and the next scene and so forth, the learner immerses herself in going through materials from the new-era book with a rich interactive experience.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams, if any, representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A non-transitory computer readable storage medium comprising instructions at least for a story, when executed by at least a processor of a mobile device of a user, operate to:
   access materials entered at a web-based social network, via connecting to the web-based social network at least through the web, with the accessed materials including at least a part of a sub-story of the story; and
   compose at least the sub-story of the story using at least (a) materials related to at least the sub-story, and (b) the accessed materials including the at least the part of the sub-story of the story, to present by the mobile device of the user,
   wherein the sub-story is related to a profile of the user, and
   wherein the instructions at least for the story, when executed by the at least a processor, operate to:
      access a plurality of accounts of the user in the mobile device;
      access data regarding the user, via at least the web, based on at least one of the accounts of the plurality of accounts of the user; and
      generate at least a part of the profile of the user from at least the accessed data regarding the user, with the profile including an account of the user for a web-based social network, with the web-based social network at least allowing a plurality of people, including the user, to enter materials at that web-based social network, and at least allowing the plurality of people to view at least some of the materials entered at that web-based social network, via connecting to that web-based social network at least through the web.

2. The non-transitory computer readable storage medium as recited in claim 1, wherein the mobile device includes at least a display.

3. The non-transitory computer readable storage medium as recited in claim 1, wherein the sub-story includes at least a plurality of objects and instructions at least for the sub-story.

4. The non-transitory computer readable storage medium as recited in claim 3, wherein the plurality of objects include a prop.

5. The non-transitory computer readable storage medium as recited in claim 3, wherein the plurality of objects include an actor.

6. The non-transitory computer readable storage medium as recited in claim 3, wherein the plurality of objects include a piece of text.

7. The non-transitory computer readable storage medium as recited in claim 3, wherein the plurality of objects include an image.

8. The non-transitory computer readable storage medium as recited in claim 3, wherein the plurality of objects include a video.

9. The non-transitory computer readable storage medium as recited in claim 3,
   wherein the mobile device includes at least a display, and
   wherein the instructions at least for the sub-story, when executed by the at least a processor, operate at least to place an object at a position on the display at a certain time, depending on the sub-story, for presenting by the at least a display.

10. The non-transitory computer readable storage medium as recited in claim 3,
    wherein the mobile device includes at least a display, and
    wherein the instructions for the sub-story, when executed by the at least a processor, operate at least to animate an object, depending on the sub-story, for presenting by the at least a display.

11. The non-transitory computer readable storage medium as recited in claim 1, wherein the instructions at least for the story, when executed by the at least a processor, operate to compose to present another sub-story of the story via the mobile device, at least based on the profile of the user.

12. The non-transitory computer readable storage medium as recited in claim 3, wherein the instructions at least for the story, when executed by the at least a processor, operate to select presenting via the mobile device, an object over another object for the sub-story, at least based on the profile of the user.

13. The non-transitory computer readable storage medium as recited in claim 3, wherein the instructions at least for the story, when executed by the at least a processor, operate to:
   select an object over another object for the sub-story; and
   execute the instructions for the sub-story on the selected object to be presented via the mobile device.

14. The non-transitory computer readable storage medium as recited in claim 3, wherein the instructions for the sub-story, when executed by the at least a processor, operate to select to be presented at least an animation for the sub-story based on the profile of the user and the sub-story.

15. The non-transitory computer readable storage medium as recited in claim 14,
   wherein the animation includes instructions for the animation, and
   wherein the instructions for the animation, when executed by the at least a processor, operate to generate at least a portion of the animation.

16. The non-transitory computer readable storage medium as recited in claim 14,
   wherein the animation includes instructions at least for the animation, and
   wherein the instructions for the animation, when executed by the at least a processor, operate to interact with the user via the mobile device.

17. The non-transitory computer readable storage medium as recited in claim 16, wherein based on the interact with the user via the mobile device, the instructions at least for the animation, when executed by the at least a processor, operate to change at least a portion of the sub-story.

18. The non-transitory computer readable storage medium as recited in claim 16, wherein based on the interact with the user via the mobile device, the instructions at least for the animation, when executed by the at least a processor, operate to select another sub-story to be presented via the mobile device.

19. The non-transitory computer readable storage medium as recited in claim 16, wherein the interact with the user via the mobile device is through at least a touch gesture from the user.

20. The non-transitory computer readable storage medium as recited in claim 16, wherein the interact with the user via the mobile device is through at least a gesture from the user.

21. The non-transitory computer readable storage medium as recited in claim 16, wherein the interact with the user via the mobile device is through at least an image of the user.

22. The non-transitory computer readable storage medium as recited in claim 16, wherein the interact with the user via the mobile device is through at least an audio input from the user.

23. The non-transitory computer readable storage medium as recited in claim 1, wherein the profile of the user includes a piece of demographic information of the user and a preference of the user.

24. The non-transitory computer readable storage medium as recited in claim 1, wherein the mobile device is configured to be operable as a mobile phone.

25. The non-transitory computer readable storage medium as recited in claim 1, wherein the instructions at least for the story, when executed by the at least a processor, operate to select another materials to be composed to present, with the select based on the profile of the user.

26. The non-transitory computer readable storage medium as recited in claim 25, wherein the instructions at least for the story, when executed by the at least a processor, operate to enable the user to identify the another materials to be selected.

27. The non-transitory computer readable storage medium as recited in claim 1,
   wherein the story includes a plurality of sub-stories, and
   wherein the instructions at least for the story, when executed by the at least a processor, operate to present at least a portion from at least some of the plurality of sub-stories via the mobile device, with at least a part from each of the at least some of the plurality of sub-stories being related to the profile of the user.

28. The non-transitory computer readable storage medium as recited in claim 1,
   wherein at least some of the materials in the set of materials related to at least the sub-story are from an entity; and
   wherein the at least some of the materials from the entity are configured to be wirelessly received by the mobile device.

29. A non-transitory computer readable storage medium comprising instructions at least for stories, when executed by at least a processor of a mobile device of a user, operate to:
   access materials entered at a web-based social network, via connecting to the web-based social network at least through the web, with the accessed materials including at least a part of a story; and
   compose at least the story using at least (a) materials related to at least the story, and (b) the accessed materials including the at least the part of the story, to present by the mobile device of the user,
   wherein the story is related to a profile of the user, and
   wherein the instructions at least for stories, when executed by the at least a processor, operate to:
      access a plurality of accounts of the user in the mobile device;
      access data regarding the user, via at least the web, based on at least one of the accounts of the plurality of accounts of the user; and
      generate at least a part of the profile of the user from at least the accessed data regarding the user, with the profile including an account of the user for a web-based social network, with the web-based social network at least allowing a plurality of people, including the user, to enter materials at that web-based social network, and at least allowing the plurality of people to view at least some of the materials entered at that web-based social network, via connecting to that web-based social network at least through the web.

30. The non-transitory computer readable storage medium as recited in claim 29, wherein the mobile device includes at least a display.

31. The non-transitory computer readable storage medium as recited in claim 29, wherein the story includes a plurality of objects and instructions for the story.

32. The non-transitory computer readable storage medium as recited in claim 31, wherein the plurality of objects include a prop.

33. The non-transitory computer readable storage medium as recited in claim 31, wherein the plurality of objects include an actor.

34. The non-transitory computer readable storage medium as recited in claim 31, wherein the plurality of objects include a piece of text.

35. The non-transitory computer readable storage medium as recited in claim 31, wherein the plurality of objects include an image.

36. The non-transitory computer readable storage medium as recited in claim 31, wherein the plurality of objects include a video.

37. The non-transitory computer readable storage medium as recited in claim 31,
wherein the mobile device includes at least a display, and
wherein the instructions at least for the story, when executed by the at least a processor, operate at least to place an object at a position on the display at a certain time, depending on the story, for presenting by the at least a display.

38. The non-transitory computer readable storage medium as recited in claim 31,
wherein the mobile device includes at least a display, and
wherein the instructions for the story, when executed by the at least a processor, operate at least to animate an object, depending on the story, for presenting by the at least a display.

39. The non-transitory computer readable storage medium as recited in claim 31, wherein the instructions for the story, when executed by the at least a processor, operate to select presenting via the mobile device, an object over another object for the story, based on the profile of the user.

40. The non-transitory computer readable storage medium as recited in claim 31, wherein the instructions for the story, when executed by the at least a processor, operate to:
select an object over another object for the story; and
execute the instructions for the story on the selected object to be presented via the mobile device.

41. The non-transitory computer readable storage medium as recited in claim 31, wherein the instructions at least for the story, when executed by the at least a processor, operate to select to be presented at least an animation for the story at least based on the profile of the user and the story.

42. The non-transitory computer readable storage medium as recited in claim 41,
wherein the animation includes instructions for the animation, and
wherein the instructions for the animation, when executed by the at least a processor, operate to generate at least a portion of the animation.

43. The non-transitory computer readable storage medium as recited in claim 41,
wherein the animation includes instructions at least for the animation, and
wherein the instructions at least for the animation, when executed by the at least a processor, operate to interact with the user via the mobile device.

44. The non-transitory computer readable storage medium as recited in claim 43, wherein based on the interact with the user via the mobile device, the instructions for the animation, when executed by the at least a processor, operate to change at least a portion of the story.

45. The non-transitory computer readable storage medium as recited in claim 43, wherein the interact with the user via the mobile device is through at least a touch gesture from the user.

46. The non-transitory computer readable storage medium as recited in claim 43, wherein the interact with the user via the mobile device is through at least a gesture from the user.

47. The non-transitory computer readable storage medium as recited in claim 43, wherein the interact with the user via the mobile device is through at least an image of the user.

48. The non-transitory computer readable storage medium as recited in claim 43, wherein the interact with the user via the mobile device is through at least an audio input from the user.

49. The non-transitory computer readable storage medium as recited in claim 29, wherein the profile of the user includes a piece of demographic information of the user and a preference of the user.

50. The non-transitory computer readable storage medium as recited in claim 29, wherein the mobile device is configured to be operable as a mobile phone.

51. The non-transitory computer readable storage medium as recited in claim 29, wherein the instructions at least for stories, when executed by the at least a processor, operate to select another materials to be composed to present, with the select based on the profile of the user.

52. The non-transitory computer readable storage medium as recited in claim 51, wherein the instructions at least for stories, when executed by the at least a processor, operate to enable the user to identify the another materials to be selected.

53. The non-transitory computer readable storage medium as recited in claim 29,
wherein at least some of the materials in the materials related to at least the story are from an entity; and
wherein the at least some of the materials from the entity are configured to be wirelessly received by the mobile device.

54. A non-transitory computer readable storage medium as recited in claim 29, wherein to access materials entered at the web-based social network is based on an account of the web-based social network in the profile of the user.

55. A non-transitory computer readable storage medium as recited in claim 1, wherein to access materials entered at the web-based social network is based on an account of the web-based social network in the profile of the user.

56. A non-transitory computer readable storage medium comprising instructions at least for stories, when previously executed by at least a processor of a mobile device of a user, operated to (a) access a plurality of accounts of the user in the mobile device; (b) access data regarding the user, via at least the web, based on at least one of the accounts of the plurality of accounts of the user; and (c) generate at least a part of a profile of the user from at least the accessed data regarding the user, with the profile including an account of the user for a web-based social network, with the web-based social network at least allowing a plurality of people, including the user, to enter materials at that web-based social network, and at least allowing the plurality of people to view at least some of the materials entered at that web-based social network, via connecting to that web-based social network at least through the web, wherein the instructions at least for stories, when executed by the at least a processor, operate to:
access materials entered at a web-based social network, via connecting to the web-based social network at least through the web, with the accessed materials including at least a part of a story; and
compose at least the story using at least (a) materials related to at least the story, and (b) the accessed materials including the at least the part of the story, to present by the mobile device of the user,
wherein the story is related to the profile of the user.

57. The non-transitory computer readable storage medium as recited in claim 56, wherein the mobile device includes at least a display.

58. The non-transitory computer readable storage medium as recited in claim 56, wherein the story includes a plurality of instructions for the story.

59. The non-transitory computer readable storage medium as recited in claim 58,
wherein the mobile device includes at least a display, and
wherein the plurality of instructions for the story, when executed by the at least a processor, operate at least to place an object at a position on the display, depending on the story, for presenting by the at least a display.

60. The non-transitory computer readable storage medium as recited in claim 58,
wherein the mobile device includes at least a display,
wherein the story includes an object, and
wherein the plurality of instructions for the story, when executed by the at least a processor, operate at least to animate the object, depending on the story, for presenting by the at least a display.

61. The non-transitory computer readable storage medium as recited in claim 60,
wherein the animation includes a plurality of instructions for the animation, and
wherein the plurality of instructions for the animation, when executed by the at least a processor, operate to generate at least a portion of the animation.

62. The non-transitory computer readable storage medium as recited in claim 60,
wherein the animation includes a plurality of instructions for the animation, and
wherein the plurality of instructions for the animation, when executed by the at least a processor, operate to interact with the user via the mobile device.

63. The non-transitory computer readable storage medium as recited in claim 62, wherein based on the interact with the user via the mobile device, the plurality of instructions for the animation, when executed by the at least a processor, operate to change at least a portion of the story.

64. The non-transitory computer readable storage medium as recited in claim 62, wherein the interact with the user via the mobile device is through at least a gesture from the user.

65. The non-transitory computer readable storage medium as recited in claim 56, wherein the materials related to at least the story includes a plurality of instructions, when executed by the at least a processor, operating to compose to present at least a portion of the story.

66. The non-transitory computer readable storage medium as recited in claim 56, wherein the instructions at least for stories, when executed by the at least a processor, operate to select another materials to be composed to present, with the select based on the profile of the user.

67. The non-transitory computer readable storage medium as recited in claim 56, wherein the instructions at least for stories, when executed by the at least a processor, operate to enable the user to select another materials to be composed to present.

68. The non-transitory computer readable storage medium as recited in claim 56,
wherein the story includes a plurality of sub-stories,
wherein the accessed materials includes at least a part of a sub-story,
wherein the compose at least the story includes composing the sub-story using at least (a) materials related to at least the sub-story, and (b) the accessed materials including the at least the part of the sub-story.

69. The non-transitory computer readable storage medium as recited in claim 56, wherein at least a portion of the accessed materials is related to the profile of the user.

70. The non-transitory computer readable storage medium as recited in claim 56, wherein to access materials entered at the web-based social network is based on an account of the web-based social network in the profile of the user.

71. A non-transitory computer readable storage medium comprising instructions, when executed by at least a processor of a mobile device of a user, operate to:
access materials entered at a web-based social network, via connecting to the web-based social network at least through the web, with the accessed materials related to at least a part of a story; and
compose to present by the mobile device at least the part of the story using at least (a) materials in the mobile device related to at least the part of the story, and (b) the accessed materials related to at least the part of the story,
wherein the computer readable storage medium is in the mobile device, and
wherein the web-based social network at least allows a plurality of people, including the user, to enter materials at the web-based social network, and at least allowing the plurality of people to view at least some of the materials entered at the web-based social network, via connecting to the web-based social network at least through the web,
wherein the at least the part of the story is related to a profile of the user, and
wherein the instructions, when executed by at least the processor, operate to:
access a plurality of accounts of the user in the mobile device; and
generate at least a part of the profile of the user based on data in at least the accessed plurality of accounts of the user in the mobile device, with the profile including at least an account of the user for a web-based social network, with the web-based social network at least allowing a plurality of people, including the user, to enter materials at that web-based social network, and at least allowing the plurality of people to view at least some of the materials entered at the web-based social network, via connecting to the web-based social network at least through the web.

72. A non-transitory computer readable storage medium, in a mobile device of a user, comprising instructions, when executed by at least a processor of the mobile device, operate to:
access materials entered at a web-based social network, via connecting to the web-based social network at least through the web, with the accessed materials including at least a part of a story; and
compose to present by the mobile device at least the story using at least (a) materials related to the story, and (b) the accessed materials that include the at least the part of the story,
wherein the compose to present uses a profile of the user, with at least some of the materials related to the story also depending on the profile of the user, and
wherein the instructions, when executed by at least the processor, operate to:
access a plurality of accounts of the user in the mobile device;
access data regarding the user, via at least the web, based on at least one of the accounts of the plurality of accounts of the user; and
generate at least a part of the profile of the user from at least the accessed data regarding the user, with the profile including an account of the user for a web-based social network, with the web-based social network at least allowing a plurality of people, including the user, to enter materials at the web-based social network, and at least allowing the plurality of people to view at least some of the materials entered at the web-based social network, via connecting to the web-based social network at least through the web.

73. The non-transitory computer readable storage medium as recited in claim 72, wherein the story includes a plurality of instructions, when executed by at least the processor, operate to generate at least a portion of the story.

74. The non-transitory computer readable storage medium as recited in claim 72, wherein the story includes a plurality of instructions, when executed by at least the processor, operate to generate at least an animation.

75. The non-transitory computer readable storage medium as recited in claim 72, wherein the story includes a plurality of instructions, when executed by at least the processor, operate to interact with the user via the mobile device.

76. The non-transitory computer readable storage medium as recited in claim 75, wherein based on the interact with the user via the mobile device, the plurality of instructions included in the story, when executed by the at least the processor, operate to change at least a portion of the story.

77. The non-transitory computer readable storage medium as recited in claim 72,
wherein the instructions, when executed by at the least the processor, operate to interact with the user via the mobile device, and
wherein based on the interact with the user via the mobile device, another materials are selected to be composed to present.

78. The non-transitory computer readable storage medium as recited in claim 72, wherein the materials related to the story include age group that the user belongs to.

79. The non-transitory computer readable storage medium as recited in claim 72, wherein the materials related to the story include a previous behavior of the user using the mobile device regarding the story.

80. The non-transitory computer readable storage medium as recited in claim 72, wherein the materials related to the story are configured to be previously accessed via the web.

81. The non-transitory computer readable storage medium as recited in claim 72, wherein the accessed materials that include at least the part of the story includes a video.

82. The non-transitory computer readable storage medium as recited in claim 72, wherein the compose to present depends on a progress of the user related to the story.

83. The non-transitory computer readable storage medium as recited in claim 82,
wherein the accessed materials include a plurality of parts, and
wherein based on the progress of the user, one part of the plurality of parts is selected to be composed to present to the user.

84. The non-transitory computer readable storage medium as recited in claim 72, wherein the story includes a plurality of instructions, when executed by at least the processor, operate to select another materials, to be composed to present, with the select based on the profile of the user.

85. The non-transitory computer readable storage medium as recited in claim 72, wherein the accessed materials include a plurality of parts, and wherein the at least the part of the story in the accessed materials used to compose at least the story is from the plurality of parts based on the profile of the user.

86. The non-transitory computer readable storage medium as recited in claim 72, wherein the compose to present by the mobile device at least the story includes composing to present by the mobile device materials related to the story.

87. The non-transitory computer readable storage medium as recited in claim 72, wherein to access materials entered at the web-based social network is based on an account of the web-based social network in the profile of the user.

* * * * *